No. 635,914. Patented Oct. 31, 1899.
J. A. BURROWS.
RUBBER TIRE SETTING MACHINE.
(Application filed May 15, 1899.)
(No Model.) 2 Sheets—Sheet 2.

Witnesses:
A. D. Alexander
Agnes R. Reilly

Inventor:
Joseph A. Burrows:
by Humphrey & Humphrey,
Attys.

THE NORRIS PETERS CO., PHOTO-LITHO., WASHINGTON, D. C.

UNITED STATES PATENT OFFICE.

JOSEPH A. BURROWS, OF AKRON, OHIO, ASSIGNOR TO THE GOODYEAR TIRE AND RUBBER COMPANY, OF SAME PLACE.

RUBBER-TIRE-SETTING MACHINE.

SPECIFICATION forming part of Letters Patent No. 635,914, dated October 31, 1899.

Application filed May 15, 1899. Serial No. 716,905. (No model.)

*To all whom it may concern:*

Be it known that I, JOSEPH A. BURROWS, a citizen of the United States, residing at Akron, in the county of Summit and State of Ohio, have invented a certain new and useful Improvement in Rubber-Tire-Setting Machines, of which the following is a specification.

My invention has relation to improvements in devices for setting or placing in tension and uniting the ends of solid rubber tires within a channeled metallic vehicle-tire; and the object of my invention is to produce new and improved mechanism by which these tires may be perfectly and rapidly placed in the metallic tire, the internal wire drawn tightly and the ends united, and the rubber ends brought together and united over the union of wire.

To the aforesaid object my invention consists in the peculiar and novel construction, arrangement, and combination of parts hereinafter described and then specifically pointed out in the claims, reference being had to the accompanying drawings, forming a part of this specification.

Figure 1:
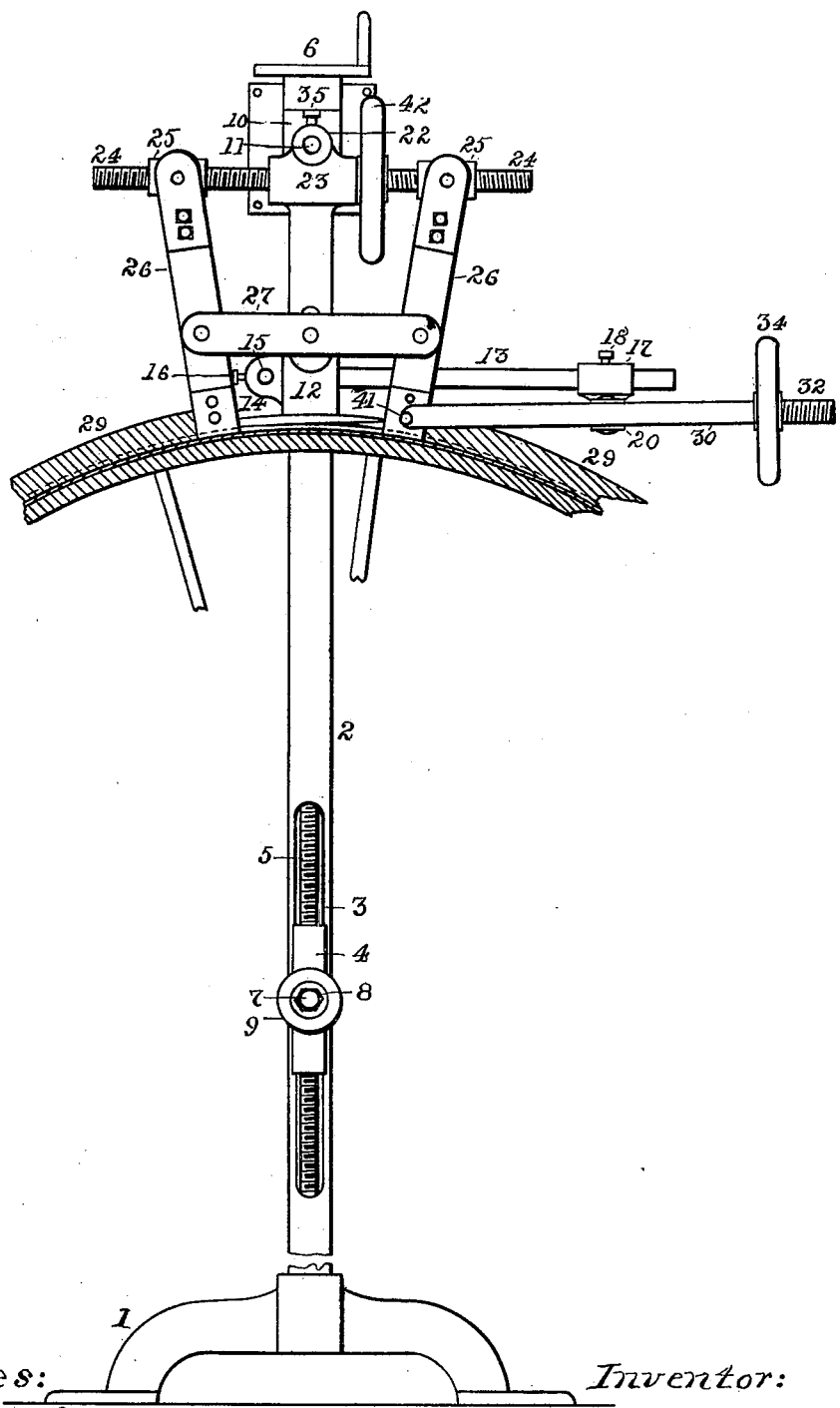
Figure 2:
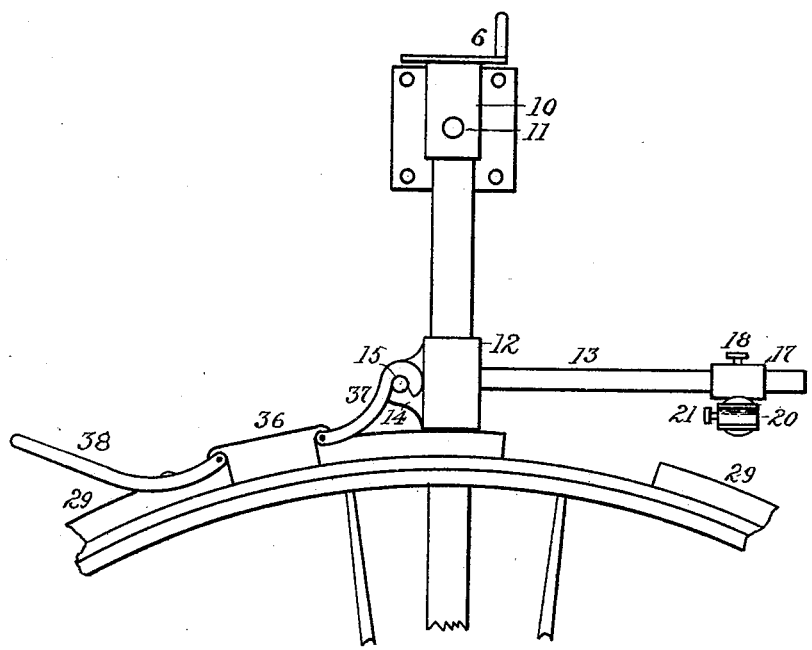
Figures 5, 6:
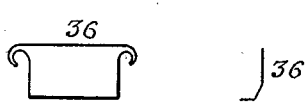
Figure 3:
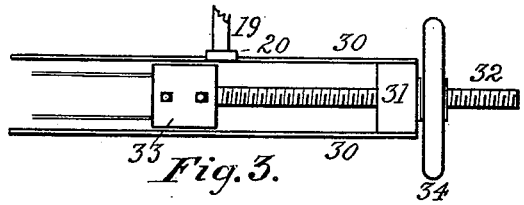
Figure 7:
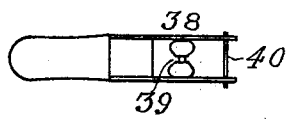
Figure 4:
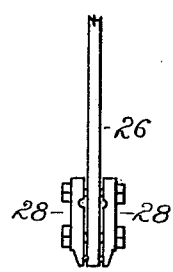

In the accompanying drawings, in which similar reference-numerals indicate like parts in the different views, Figure 1 is an elevation of my improved machine, illustrating the operation of drawing the inside wire taut preparatory to brazing or otherwise uniting its ends, to show which the wheel-felly is shown in section; Fig. 2, a part of the same machine, showing the devices for forcing together the ends of the rubber on the united tire; Fig. 3, a plan of the tightening device hereinafter described; Fig. 4, a detail view of wire clamps; Figs. 5 and 6, side and end elevations of the plates for bringing the rubber forward to form a union, and Fig. 7 a view of the forked roll-carrying lever hereinafter described for squeezing and carrying forward the fullness of rubber after the wires are united.

Referring to the figures, 1 is a base, from the center of which rises a hollow shaft 2, having in one side a slotted opening 3, in which a long nut 4 moves vertically on an internal screw 5, that extends from the top of the shaft and bears at its top a hand-wheel and handle 6, by which it is turned. This nut 4 bears, projecting from its face, a bolt 7, provided with a nut and washer 8, between which and the nut 4 are freely mounted two conical sleeves 9, (the larger end of the outer one only being seen in Fig. 1,) with their smaller ends toward each other, and which constitute pivots to enter the ends of the hub-box and support the wheel while being fitted with the tire.

On the upper end of the shaft 2, immediately below the hub of the hand-wheel 6, is a fixed sleeve 10, from the front of which projects a short horizontal shaft or wrist 11, and below this is a second sleeve 12, from one side of which extends a horizontal bar 13 and from the other side a lug 14, through which is passed a short rod 15, with ends extending in each direction and retained by a set-screw 16.

On the bar 13 is an adjustable slide 17, retained by a set-screw 18, and in the lower part is a horizontal socket at a right angle with the bar 13, in which a short wrist 19, bearing at its front end a horizontal channel 20, is retained by a set-screw 21, which parts will be understood by reference to Figs. 2 and 3.

On the wrist 11 is mounted a sleeve 22, integral with which is a transverse horizontal sleeve 23, having an opening adapted to receive the center of a shaft 24, screw-threaded in opposite directions on the two halves, and on this shaft is keyed a wheel 42, by which it may be turned. On the threaded ends of this shaft are nuts 25, pivotally connected with which are two levers 26, pivotally connected below their centers by a yoke 27. The lower ends of these levers are provided with clamps arranged to grasp the wire or wires of the rubber tire. The construction of these clamps is shown in Fig. 4, and each consists of the lever 26 and two side pieces 28, the lever and side pieces being grooved in their adjacent faces, near their lower ends, to form jaws to grasp the wire and with larger grooves above to allow the opposite ends of the wires to pass freely through.

In operation a wheel is placed on the cones 9 and raised to the proper height by turning the screw 5 by means of the hand-wheel 6. The rubber tire 29 is then placed in the channel of the iron tire, with wires inserted lengthwise and their ends projecting and the wires extending from the right end grasped in the clamp at the end of the right lever 26 sufficiently back of their ends to permit them to extend to or past the shaft 2. A tightening device is then employed to draw the wires tight. This device consists of two parallel bars 30, united at one end by a block 31, through which is an opening to permit a screw to pass freely. The opposite ends of these bars have semicircular notches arranged to rest against the projecting ends of a pin 41, that passes through the clamp at the lower end of the right lever 26. A screw-shaft 32 passes through the block 31 and bears at its inner end a clamp 33, secured by short bolts and arranged to grasp the ends of the wires that come through the clamp on the end of the left bar 26. A nut in the hub of a hand-wheel 34 runs on the screw 32 and rests against the block 31, and this is then turned until the wires are tightly drawn about the wheel, where the clamp of the left bar 26 is tightened, the wires cut between the levers 26 in such a way as to slightly lap, and the bars 30 and connected parts removed. The wheel 42 is then used to adjust the wires tangential to the periphery of the wheel, where they are united by brazing or other approved means. The clamps on the ends of the levers 26 are then released, and these are rocked upward on the wrist 11 and held out of the way by a set-screw 35. To bring the rubber forward from each direction to unite the ends, two plates 36 (shown in side and end elevation in Figs. 5 and 6) are employed. These plates are each conformed to fit the side of the rubber tire and extend under it, and each has a downwardly-turned hook at each end. Before the rubber tire is drawn tightly, as hereinbefore described, pairs of these plates in opposite disposition are placed at intervals back from the end of the rubber with their bent edges under it, as shown in Fig. 2. A double-forked hook 37 is then caught onto the ends of the rod 15 and the wheel turned to the right until the front hooks of the first pair of plates 36 will engage the cross-rod between the back forks of said hook. A forked lever 38, having intermediate rollers 39, Fig. 7, and a cross-bar 40, is then connected with the back hooks of said plates 36 and pressed down to bring the rollers 39 on the rubber and the wheel revolved slowly to the left. This process squeezes or swages the rubber and carries the fullness forward toward the joint. This process is repeated with other pairs of plates successively toward the joint until the two ends of the rubber meet and are united by cement. The plates 36 are successively removed after being employed with the lever 38, thus leaving the completed wheel.

Having thus described my invention, what I claim, and desire to secure by Letters Patent, is—

1. In a rubber-tire-setting machine, the combination with a supporting-post, and an adjustable device to support the wheel-hub, of oppositely-disposed levers having clamps to hold the opposite ends of the tire-wire and intermediately pivotally connected by a yoke, of a frame arranged to rest against a part of one of said levers, bearing an abutment-block at its outer end; a screw running in said block provided with means for grasping the ends of the tire-wires, and a nut running on said screw and arranged to bear against said abutment-block, substantially as shown and described.

2. In a rubber-tire-setting machine, the combination with a supporting-post, and a device to support the wheel-hub, and means for placing the tire-wires in tension, of anchor-pins connected with said post, a hook to engage said pins; dual plates arranged in opposite disposition to rest beside and under said tire, and connected with said hook, and a bifurcated lever, arranged and adapted to engage said plates and bearing-rollers to bear upon said tire, substantially as shown and described.

In testimony that I claim the above I hereunto set my hand.

JOSEPH A. BURROWS.

In presence of—
C. P. HUMPHREY,
NELLIE M. DANFORTH.